US011360792B2

(12) United States Patent
Chenguttuvan et al.

(10) Patent No.: US 11,360,792 B2
(45) Date of Patent: Jun. 14, 2022

(54) METHOD AND SYSTEM FOR AUTOMATIC SELECTION OF PROCESS AUTOMATION RPA TOOL AND BOT

(71) Applicant: Wipro Limited, Bangalore (IN)

(72) Inventors: Gopinath Chenguttuvan, Chennai (IN); Swamynathan Ramalingam, Kancheepuram (IN)

(73) Assignee: Wipro Limited, Bangalore (IN)

(*) Notice: Subject to any disclaimer, the term of this patent is extended or adjusted under 35 U.S.C. 154(b) by 0 days.

(21) Appl. No.: 17/038,153

(22) Filed: Sep. 30, 2020

(65) Prior Publication Data

US 2021/0397462 A1    Dec. 23, 2021

(30) Foreign Application Priority Data

Jun. 17, 2020  (IN) .............................. 202041025383

(51) Int. Cl.
| | |
|---|---|
| *G06F 9/451* | (2018.01) |
| *G06F 17/18* | (2006.01) |
| *G06N 20/00* | (2019.01) |
| *G06N 5/00* | (2006.01) |

(52) U.S. Cl.
CPC .............. *G06F 9/451* (2018.02); *G06F 17/18* (2013.01); *G06N 5/003* (2013.01); *G06N 20/00* (2019.01)

(58) Field of Classification Search
CPC ......... G06F 9/451; G06F 17/18; G06N 20/00; G06N 5/003
USPC ........................................................ 715/853
See application file for complete search history.

(56) References Cited

U.S. PATENT DOCUMENTS

| | | | | |
|---|---|---|---|---|
| 9,928,106 | B2* | 3/2018 | Hosabettu | G06F 9/4843 |
| 10,270,644 | B1* | 4/2019 | Valsecchi | H04L 41/0654 |
| 10,339,027 | B2* | 7/2019 | Garcia | G06F 11/3409 |
| 10,354,225 | B2* | 7/2019 | Sharma | B25J 9/1656 |
| 10,796,080 | B2* | 10/2020 | Priestas | G06F 40/295 |
| 10,817,314 | B1* | 10/2020 | Ganesan | G06F 8/38 |
| 10,853,097 | B1* | 12/2020 | Kakhandiki | G06F 9/451 |
| 10,977,293 | B2* | 4/2021 | Cai | G06F 16/358 |
| 11,054,960 | B1* | 7/2021 | Munteanu | G06F 9/3017 |
| 11,074,528 | B2* | 7/2021 | Gupta | G06N 3/006 |

(Continued)

OTHER PUBLICATIONS

Boulton, C., "What is RPA? A revolution in business process automation", CIO Sep. 3, 2018 (9 pages).

*Primary Examiner* — William D Titcomb
(74) *Attorney, Agent, or Firm* — Finnegan, Henderson, Farabow, Garrett & Dunner, LLP

(57) ABSTRACT

The present invention discloses a method and a system for automatic selection of process automation Robotic Process Automation (RPA) tool and BOT. The method comprising receiving input data associated with a process to be executed, selecting an RPA tool from a plurality of RPA tools for process execution based on the input data and historical process data, wherein the selection is performed by calculating information gain for each parameter of the input data and computing probability for each type of RPA tool based on the information gain and the historical process data, identifying one or more BOTs from a plurality of BOTs based on the selected RPA tool, historical BOT data and the input data for the process execution, and executing the identified one or more BOTs on one or more devices based on selection of the one or more devices from available plurality of devices.

14 Claims, 3 Drawing Sheets

(56) References Cited

U.S. PATENT DOCUMENTS

2016/0019484 A1\* 1/2016 Srivastava ..... G06Q 10/063118
　　　　　　　　　　　　　　　　　　　　　　　705/7.17
2019/0066013 A1\* 2/2019 Gupta .............. G06Q 10/06311
2019/0066018 A1　2/2019 Sethi et al.
2019/0155225 A1　5/2019 Kothandaraman et al.

\* cited by examiner

US 11,360,792 B2

METHOD AND SYSTEM FOR AUTOMATIC SELECTION OF PROCESS AUTOMATION RPA TOOL AND BOT

TECHNICAL FIELD

The present subject matter is generally related to a field of process automation, more particularly, but not exclusively, to a method and a system for automatic selection of process automation Robotic Process Automation (RPA) tool and BOT.

BACKGROUND

With advancements in the field of automation, Robotic Process Automation (RPA) and BOT technologies allow emulating and automating the actions of an RPA architect to some extent to execute processes related to industries such as manufacturing, telecommunication, logistic, banking and financial services. At present stage, intervention-free automatic selection of an appropriate RPA tool and BOT for process automation still remains a challenge. For instance, manual intervention is required for the selection of appropriate RPA tool based on process requirement. This leads to increase in processing time and decrease in efficiency of the automation system. After identification of appropriate BOT for process automation, execution of process has to wait based on the availability of the appropriate BOT. This causes delay in the process execution and hampers efficiency of the RPA tool. In case of a situation that has a completely new requirement for process execution, an RPA architect has to manually select the appropriate BOT. Such manual intervention delays the overall cycle time of the automation system. Thus, there is a need for an automatic selection of appropriate RPA tool and BOT for process automation.

The information disclosed in this background of the disclosure section is for enhancement of understanding of the general background of the invention and should not be taken as an acknowledgement or any form of suggestion that this information forms the prior art already known to a person skilled in the art.

SUMMARY

The present disclosure relates to a method and a system for automatically selecting an appropriate RPA tool and one or more BOTs based on process requirements.

In an embodiment, the present disclosure may relate to a method for automatic selection of process automation Robotic Process Automation (RPA) tool and BOT. The method includes receiving input data associated with a process to be executed and selecting an RPA tool from a plurality of RPA tools for process execution based on the input data and historical process data. The selection is performed by calculating information gain for each parameter of the input data and computing probability for each type of RPA tool based on the information gain and the historical process data. The method further includes identifying one or more BOTs from a plurality of BOTs based on the selected RPA tool, historical BOT data and the input data for the process execution. Subsequently, the method includes executing the identified one or more BOTs on one or more devices based on selection of the one or more devices from available plurality of devices.

In an embodiment, the present disclosure may relate to a process automation system for automatic selection of process automation RPA tool and BOT. The system may include a processor and a memory communicatively coupled to the processor, wherein the memory stores processor-executable instructions, which on execution, cause the processor to receive input data associated with a process to be executed and to select an RPA tool from a plurality of RPA tools for process execution based on the input data and historical process data. The selection is performed by calculating information gain for each parameter of the input data and computing probability for each type of RPA tool based on the information gain and the historical process data. The system further causes the processor to identify one or more BOTs from a plurality of BOTs based on the selected RPA tool, historical BOT data and the input data for the process execution and to execute the identified one or more BOTs on one or more devices based on selection of the one or more devices from available plurality of devices.

In an embodiment, the present disclosure may relate to a non-transitory computer readable medium including instructions stored thereon that when processed by at least one processor cause a process automation system to perform operations comprising receiving input data associated with a process to be executed, selecting an RPA tool from a plurality of RPA tools for process execution based on the input data and historical process data, wherein the selection is performed by calculating information gain for each parameter of the input data and computing probability for each type of RPA tool based on the information gain and the historical process data, identifying one or more BOTs from a plurality of BOTs based on the selected RPA tool, historical BOT data and the input data for the process execution, and executing the identified one or more BOTs on one or more devices based on selection of the one or more devices from available plurality of devices.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The accompanying drawings, which are incorporated in and constitute a part of this disclosure, illustrate exemplary embodiments and together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described below, by way of example only, and with reference to the accompanying figures.

Figure 1:
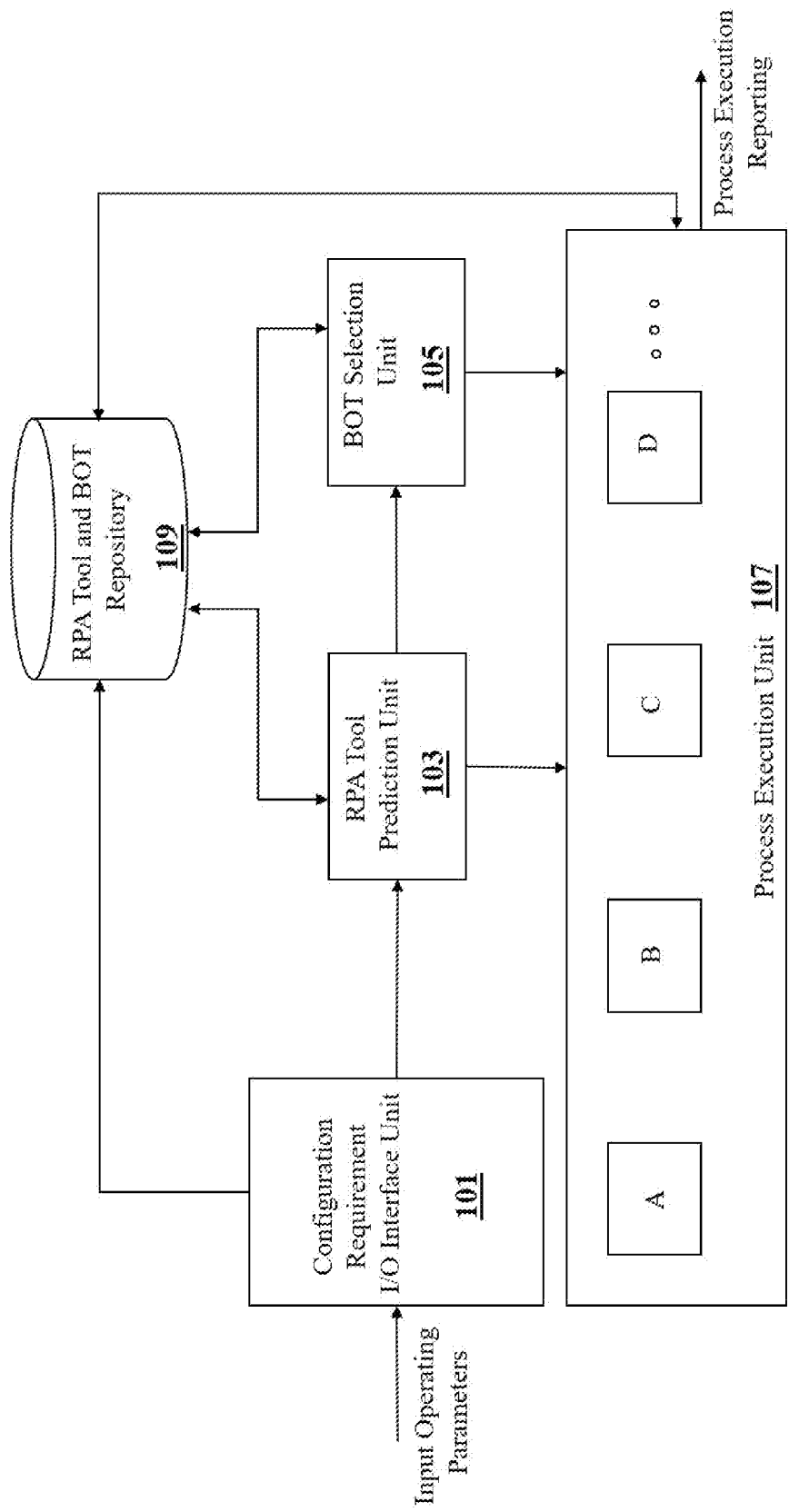
FIG. 1 shows a detailed block diagram of a process automation system in accordance with some embodiments of the present disclosure.

It should be appreciated by those skilled in the art that any block diagrams herein represent conceptual views of illustrative systems embodying the principles of the present subject matter. Similarly, it will be appreciated that any flowcharts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure relates to a system and a method for automatic selection of process automation RPA tool and BOT for process execution. The present disclosure utilizes machine learning based prediction of appropriate RPA tools for configuration requirements. The machine learning technique includes decision tree algorithm for predicting the RPA tool. The RPA tool prediction is carried out by analysing input data with reference to a training data set. In one embodiment parameters such as Gini index and Entropy are utilized to measure impurity index which is further used to identify false positive cases and enhance accuracy of determining the appropriate RPA tool. After the prediction of appropriate RPA tool, one or more BOTs are determined using statistical Jaccard index. Subsequently, the availability of the one or more BOT and devices is identified for the process execution. If any identified device is executing some other process or is determined to be not available, the availability of another device from a pool of devices is identified for the process execution. This approach reduces processing time and increases efficiency of an automation system.

FIG. 1 shows a detailed block diagram of a process automation system in accordance with some embodiments of the present disclosure.

As shown in the FIG. 1, the process automation system environment includes a configuration requirement I/O interface unit 101, an RPA prediction unit 103, a BOT selection unit 105, a process execution unit 107 and an RPA tool and BOT repository 109. In the embodiment, the one or more units of the process automation system mentioned above may be implemented as dedicated hardware units. As used herein, the term unit refers to an Application Specific Integrated Circuit (ASIC), an electronic circuit, a Field-Programmable Gate Arrays (FPGA), Programmable System-on-Chip (PSoC), a combinational logic circuit, and/or other suitable components that provide the described functionality. The said one or more units when configured with the functionality defined in the present disclosure will result in a novel hardware.

Configuration requirement I/O interface unit 101: In order to automate execution of process, input data (input operating parameters) may be provided by a user to the configuration requirement I/O interface unit 101 via I/O interface. This unit may receive configuration requirement such as technology type parameter, an application (app) type parameter, a cognitive capability level parameter, a macro recorder status parameter, a Citrix automation availability parameter and a coding dependency level parameter. The technology type parameter may include C#, Dotnet, VB, Python, Java and the like through which automation script may be created in the RPA prediction unit 103. The configuration requirement I/O interface unit 101 may, also, receive non-configuration (business) requirement for the process automation via the I/O interface. The non-configuration requirement may be an actual input (plain text) for which a suitable BOT needs to identified and executed. The execution of suitable BOT fulfils a need such as set of actions on an app (application), API (application program interface) or DB (database). The configuration requirement and/or non-configuration requirement may be referred as input operating parameters or input data. The I/O interface may include a variety of software and hardware interfaces, for example, a web interface, a graphical user interface and the like, that allows to feed the input data to the process automation system. In an embodiment, the I/O interface may be communicatively coupled to the configuration requirement I/O interface unit 101. Further, the configuration requirement I/O interface unit 101 may enable the process automation system to communicate with other computing devices/units such as the RPA prediction unit 103, the RPA tool and BOT repository 109 and the BOT selection unit 105 (connection not shown in FIG. 1). The I/O interface may facilitate wired/wireless communication protocols/methods. The communication protocols/methods may include, but is not limited to, a direct interconnection, an e-commerce network, a Peer-to-Peer (P2P) network, Local Area Network (LAN), Wide Area Network (WAN), wired, wireless network (for example, Code-Division Multiple Access (CDMA), High-Speed Packet Access (HSPA+), Global System for Mobile communications (GSM®), Long-Term Evolution (LTE®) and Worldwide interoperability for Microwave access (WiMax®)), Internet, Wi-Fi, Bluetooth and the like. The I/O interface may include one or more ports for connecting several devices to each other or to one or more servers. Upon receiving the input data, the configuration requirement I/O interface unit 101 may send the input data to the RPA tool prediction unit 103 and the BOT selection unit 105.

RPA tool prediction unit 103: This unit may receive input data associated for execution of process, for instance, for process execution of software application from the configuration requirement I/O interface unit 101. The input data comprising the configuration requirement may include technology type parameter, an application (app) type parameter, a cognitive capability level parameter, a macro recorder status parameter, a Citrix automation availability parameter and a coding dependency level parameter. For example, the application (app) type parameter may be, but not limited to, a free application software, a banking software, a government software, an industrial software, a video software, a legal software, an educational software, a communication software, an entertainment software, a genealogy software, a multimedia software, a science software, a chemical engineering software and mobile applications. Upon receiving the input data, the RPA tool prediction unit 103 may select an RPA tool by analysing the configuration requirement. In order to select an optimal RPA tool from a plurality of RPA tools, this unit may implement a machine learning algorithm. In an embodiment, machine learning based decision tree technique may be implemented for selecting the RPA tool. The RPA tool prediction unit 103 may select the RPA tool based on the input data and historical process data i.e. by analysing the input data with reference to the historical process data. The historical process data may, also, be referred as a training process data set. An example of historical process data is depicted below in Table 1.

The Table 1 may comprise configuration requirement such the technology type parameter, the application (app) type parameter, the cognitive capability level parameter, the macro recorder status parameter, the Citrix automation availability parameter and the coding dependency level parameter. During training, each of the configuration parameter are tested with a set of input data and using the machine learning technique an appropriate RPA tool from a plurality of RPA tools is selected. For example, suppose the configuration requirement is such that the technology type parameter is .Net, the application (app) type parameter is a desktop application, the cognitive capability level parameter is low level, the macro recorder status parameter is yes, the Citrix automation availability parameter is yes and the coding dependency level parameter is low level, the RPA prediction unit 103 may select Uipath RPA tool for executing the process. The historical process data set shown in the Table 1 may be provided as an input to the RPA tool prediction unit 103 along with the input data. The RPA tool prediction unit 103 may implement the decision tree algorithm for predictive modelling for selecting an RPA tool.

The historical process data depicted in the Table 1 implies that configuration requirement may comprise of six parameters i.e. the technology type parameter, the application (app) type parameter, the cognitive capability level parameter, the macro recorder status parameter, the Citrix automation availability parameter and the coding dependency level parameter. Therefore, the RPA tool prediction unit 103 may create decision tree for each parameter of the configuration requirement by calculating information gain for each parameter of the input data and computing probability for each type of RPA tool based on the information gain and the historical process data. The decision tree algorithm may be

TABLE 1

| Technology Type | App Type | Cognitive Capability Level | Macro Recorder Status | Citrix Automation Availability | Coding Dependency Level | RPA Tool |
| --- | --- | --- | --- | --- | --- | --- |
| .Net | Desktop | Low | YES | YES | Low | Uipath |
| .Net | Web | Medium | YES | YES | Low | Automation Anywhere |
| C# | Web | Low | NO | YES | Low | Blueprism |
| VB | Desktop | Low | YES | NO | Medium | Nice |
| .Net | Desktop | Medium | YES | NO | Medium | Kofax Kapow |
| VB | Desktop | Low | YES | YES | Low | Uipath |
| Python | Desktop | Low | YES | YES | Low | Uipath |
| Java | Desktop | Medium | YES | NO | Medium | Kofax Kapow |
| C# | Desktop | Low | YES | NO | Medium | Nice |
| .Net | Web | Low | NO | YES | Low | Blueprism | dynamically modified based on the historical process data set provided as an input to the RPA tool prediction unit 103.

The working of the RPA prediction unit 103 is explained below. Initially, the Table 1 may be modified to have a binary result for every RPA tool as shown below in Table 2.

TABLE 2

| Technology Type | App Type | Cognitive Capability Level | Macro Recorder Status | Citrix Automation Availability | Coding Dependency Level | RPA Tool |
|---|---|---|---|---|---|---|
| .Net | Desktop | Low | YES | YES | Low | Uipath |
| .Net | Web | Medium | YES | YES | Low | Not a Uipath |
| C# | Web | Low | NO | YES | Low | Not a Uipath |
| VB | Desktop | Low | YES | NO | Medium | Not a Uipath |
| .Net | Desktop | Medium | YES | NO | Medium | Not a Uipath |
| VB | Desktop | Low | YES | YES | Low | Uipath |
| Python | Desktop | Low | YES | YES | Low | Uipath |
| Java | Desktop | Medium | YES | NO | Medium | Not a Uipath |
| C# | Desktop | Low | YES | NO | Medium | Not a Uipath |
| .Net | Web | Low | NO | YES | Low | Not a Uipath |

As a first step, for the above example, parameters such as Gini index and Entropy may be calculated. Gini Index and Entropy are measured to find the impurity of each parameter of the configuration requirement. The Gini index may be a measure of impurity used in building Gini index. The Entropy may be used to measure the impurity. Based on the Entropy, parameter Information Gain may be calculated. The Information Gain may measure the reduction in entropy and subsequently, the measured Information Gain may be used for deciding which attribute to be selected as the decision node for the machine learning based decision tree technique.

In Table 2, there are overall ten instances or occurrences. The probability for being "Uipath" in those ten instances is 3/10 or 0.3. Analogously, the probability for being "Not a Uipath" in those instances is 7/10 or 0.7.

From the above-calculated probability data, the Entropy may be calculated using following formula:

$$\text{Entropy}(S) = -P(\text{Uipath})*\log 2P(\text{Uipath}) - P(\text{Not a Uipath})*\log 2P(\text{Not a Uipath})$$

Here, S=total sample space.

For the current example, the Entropy can be calculated as following:

$$\text{Entropy}(S) = -0.3*\log 2(0.3) - 0.7*\log 2(0.7)$$
$$= -0.3(-1.73) - 0.7(-0.51)$$
$$= 0.519 + 0.357$$
$$\text{Entropy}(S) = 0.876$$

In the next step, for the current example, the Information Gain may be calculated, which is given by the following formula:

$$\text{Information Gain} = \text{Entropy}(S) - [(\text{weighted Avg})*\text{Entropy(each feature)}]$$

Here, S=total sample space.

Here, [(weighted Avg)*Entropy(each feature)] may be referred as Information.

From this point, Information Gain for configuration requirement may be calculated in a following way starting with technology type parameter. For each of technology type parameter, number of RPA tools are collected as shown in Table 3.

TABLE 3

| Technology Type | | | | |
|---|---|---|---|---|
| .Net | C# | VB | Python | Java |
| Uipath | Not a Uipath | Not a Uipath | Uipath | Not a Uipath |
| Not a Uipath | Not a Uipath | Uipath | | |
| Not a Uipath | | | | |
| Not a Uipath | | | | |

From Table 3, for each (feature) of the technology type parameter i.e. .Net, C#, VB, Python and Java, Entropy may be calculated using following formula:

$$\text{Entropy}(S) = -P(Uipath)*\log 2\ P(Uipath) - P(\text{Not a } Uipath)*\log 2\ P(\text{Not a } Uipath)$$

$$E(\text{Technology Type} = .NET) = -1/4 * \log 2(1/4) - 3/4 * \log 2(3/4)$$
$$= -0.25 * \log 2(0.25) - 0.75 * \log 2(0.75)$$
$$= -0.25(-2) - 0.75(-0.41)$$
$$= 0.5 + 0.30$$
$$= 0.8$$

$$E(\text{Technology Type} = \#C) = -2/2 * \log 2(2/2)$$
$$= -\log 2(1)$$
$$= 0$$

$$E(\text{Technology Type} = VB) = -1/2 * \log 2(1/2) - 1/2 * \log 2(1/2)$$
$$= -0.5 * \log 2(0.5) - 0.5 * \log 2(0.5)$$
$$= -0.5(-1) - 0.5(-1)$$
$$= 0.5 + 0.5$$
$$= 1$$

$$E(\text{Technology Type} = \text{Python}) = 0$$
$$E(\text{Technology Type} = \text{Java}) = 0$$

-continued $$\text{Information from Technology Type} = [(\text{weighted Avg}) * \text{Entropy(each feature)}]$$
$$= (4/10 * 0.8) + 0 + (2/10 * 1) + 0 + 0$$
$$= 0.52$$

From the above-calculated Entropy for each (feature) of the technology type parameter and Information from Technology, Information Gain may be calculated, which is given as following:

$$\text{Information Gain from} = E(S) - \text{Information from Technology Type}$$
$$\text{Technology Type} = 0.876 - 0.52$$
$$= 0.356$$

Analogously, Information Gain for next configuration requirement i.e. application (app) type parameter may be calculated. For each of the application (app) type parameter, number of RPA tools are collected as shown in Table 4.

TABLE 4

| App Type | |
|---|---|
| Desktop | Web |
| Uipath | Not a Uipath |
| Not a Uipath | Not a Uipath |
| Not a Uipath | Not a Uipath |
| Uipath | |
| Uipath | |
| Not a Uipath | |
| Not a Uipath | |

From Table 4, for each (feature) of the application (app) type parameter i.e. Desktop and Web, Entropy may be calculated using formula mentioned above.

$$E(\text{App Type} = \text{Desktop}) = -3/7 * \log2(3/7) - 4/7 * \log2(3/7)$$
$$= -0.42 * \log2(0.42) - 0.57 * \log2(0.57)$$
$$= -0.42(-1.25) - 0.57(-0.81)$$
$$= 0.52 + 0.46$$
$$= 0.98$$

$$E(\text{App Type} = \text{Web}) = 0$$

$$\text{Information from App Type} = [(\text{weighted Avg}) * \text{Entropy(each feature)}]$$
$$= (7/10 * 0.98) + 0$$
$$= 0.68$$

From the above-calculated Entropy for each (feature) of the application (app) type parameter and Information from App Type, Information Gain may be calculated, which is given as following:

$$\text{Information Gain from App Type} = E(S) - \text{Information from App Type}$$
$$= 0.876 - 0.68$$
$$= 0.196$$

Next, Information Gain for next configuration requirement i.e. cognitive capability level parameter may be calculated. For each of the cognitive capability level parameter, number of RPA tools are collected as shown in Table 5.

TABLE 5

| Cognitive Capability Level | |
|---|---|
| Low | Medium |
| Uipath | Not a Uipath |
| Not a Uipath | Not a Uipath |
| Not a Uipath | Not a Uipath |
| Uipath | |
| Uipath | |
| Not a Uipath | |
| Not a Uipath | |

From Table 5, for each (feature) of the cognitive capability level parameter i.e. Low and Medium, Entropy may be calculated using formula mentioned above.

$$E(\text{Cognitive Capability Level} = \text{Low}) = -3/7 * \log2(3/7) - 4/7 * \log2(3/7)$$
$$= -0.42 * \log2(0.42) - 0.57 * \log2(0.57)$$
$$= -0.42(-1.25) - 0.57(-0.81)$$
$$= 0.52 + 0.46$$
$$= 0.98$$

$$E(\text{Cognitive Capability Level} = \text{Medium}) = 0$$

$$\text{Information from Cognitive} = [(\text{weighted Avg}) * \text{Entropy(each feature)}]$$
$$\text{Capability Level} = (7/10 * 0.98) + 0$$
$$= 0.68$$

From the above-calculated Entropy for each (feature) of the cognitive capability level parameter and Information from Cognitive Capability Level, Information Gain may be calculated, which is given as following:

$$\text{Information Gain from Cognitive} = E(S) - \text{Information from Cognitive}$$
$$\text{Capability Level} = 0.876 - 0.68$$
$$= 0.196$$

Next, Information Gain for next configuration requirement i.e. macro recorder status parameter may be calculated. For each of the macro recorder status parameter, number of RPA tools are collected as shown in Table 6.

TABLE 6

| Macro Recorder Status | |
|---|---|
| YES | NO |
| Uipath | Not a Uipath |
| Not a Uipath | Not a Uipath |
| Not a Uipath | |
| Not a Uipath | |
| Uipath | |

TABLE 6-continued

| Macro Recorder Status | |
|---|---|
| YES | NO |
| Uipath | |
| Not a Uipath | |
| Not a Uipath | |

From Table 6, for each (feature) of the macro recorder status parameter i.e. Yes and No, Entropy may be calculated using formula mentioned above.

$$E(\text{Macro Recorder Status = YES}) = -3/8 * \log2(3/8) - 5/8 * \log2(5/8)$$
$$= -0.37 * \log2(0.37) - 0.62 * \log2(0.62)$$
$$= 0.37(-1.43) - 0.62(-0.68)$$
$$= 0.5291 + 0.4216$$
$$= 0.95$$

$$E(\text{Macro Recorder Status = NO}) = 0$$

$$\text{Information from Macro} = [(\text{weighted Avg}) * \text{Entropy(each feature)}]$$
$$\text{Recorder Status} = (8/10 * 0.95) + 0$$
$$= 0.76$$

From the above-calculated Entropy for each (feature) of the macro recorder status parameter and Information from Macro Recorder Status, Information Gain may be calculated, which is given as following:

$$\text{Information Gain from Macro} = E(S) - \text{Information from Macro}$$
$$\text{Recorder Status Recorder Status}$$
$$= 0.876 - 0.76$$
$$= 0.116$$

Next, Information Gain for next configuration requirement i.e. citrix automation availability parameter may be calculated. For each of the citrix automation availability parameter, number of RPA tools are collected as shown in Table 7.

TABLE 7

| Citrix Automation Availability | |
|---|---|
| YES | NO |
| Uipath | Not a Uipath |
| Not a Uipath | Not a Uipath |
| Not a Uipath | Not a Uipath |
| Uipath | Not a Uipath |
| Uipath | |
| Not a Uipath | |

From Table 7, for each (feature) of the citrix automation availability parameter i.e. Yes and No, Entropy may be calculated using formula mentioned above.

$$E(\text{Citrix Automation Availability = YES}) = -3/6 * \log2(3/6) - 3/6 * \log2(3/6)$$
$$= -1/2 * \log2(1/2) - 1/2 * \log2(1/2)$$
$$= -0.5 * \log2(0.5) - 0.5 * \log2(0.5)$$
$$= -0.5(-1) - 0.5(-1)$$
$$= 0.5 + 0.5$$
$$= 1$$

$$E(\text{Citrix Automation Availability = NO}) = 0$$

$$\text{Information from Citrix} = [(\text{weighted Avg}) * \text{Entropy(each feature)}]$$
$$\text{Automation Availability} = (6/10 * 1) + 0$$
$$= 0.6$$

From the above-calculated Entropy for each (feature) of the citrix automation availability parameter and Information from Citrix Automation Availability, Information Gain may be calculated, which is given as following:

$$\text{Information Gain from Citrix} = E(S) - \text{Information from Citrix}$$
$$\text{Automation Availability Automation Availability}$$
$$= 0.876 - 0.6$$
$$= 0.276$$

Next, Information Gain for next configuration requirement i.e. coding dependency level parameter may be calculated. For each of the coding dependency level parameter, number of RPA tools are collected as shown in Table 8.

TABLE 8

| Coding Dependency Level | |
|---|---|
| Low | Medium |
| Uipath | Not a Uipath |
| Not a Uipath | Not a Uipath |
| Not a Uipath | Not a Uipath |
| Uipath | Not a Uipath |
| Uipath | |
| Not a Uipath | |

From Table 8, for each (feature) of the coding dependency level parameter i.e. Low and Medium, Entropy may be calculated using formula mentioned above.

$$E(\text{Coding Dependency Level = Low}) = -3/6 * \log2(3/6) - 3/6 * \log2(3/6)$$
$$= -1/2 * \log2(1/2) - 1/2 * \log2(1/2)$$
$$= -0.5 * \log2(0.5) - 0.5 * \log2(0.5)$$
$$= -0.5(-1) - 0.5(-1)$$
$$= 0.5 + 0.5$$
$$= 1$$

-continued $E(\text{Coding Dependency Level} = \text{Medium}) = 0$

Information from Coding = [(weighted Avg) * Entropy(each feature)]

Dependency Level = (6/10 * 1) + 0

= 0.6

From the above-calculated Entropy for each (feature) of the coding dependency level parameter and Information from Coding Dependency Level, Information Gain may be calculated, which is given as following:

Information Gain from Coding = $E(S)$ − Information from

Dependency LevelCognitive Capability Level

= 0.876 − 0.6

= 0.276

The Information Gain calculated above for each of the configuration requirement such the technology type parameter, the application (app) type parameter, the cognitive capability level parameter, the macro recorder status parameter, the Citrix automation availability parameter and the coding dependency level parameter are shown in Table 9.

TABLE 9

Information Gain

| Technology Type | 0.356 |
|---|---|
| App Type | 0.196 |
| Cognitive Capability Level | 0.196 |
| Macro Recorder Status | 0.116 |
| Citrix Automation Availability | 0.276 |
| Coding Dependency Level | 0.276 |

Figure 2:
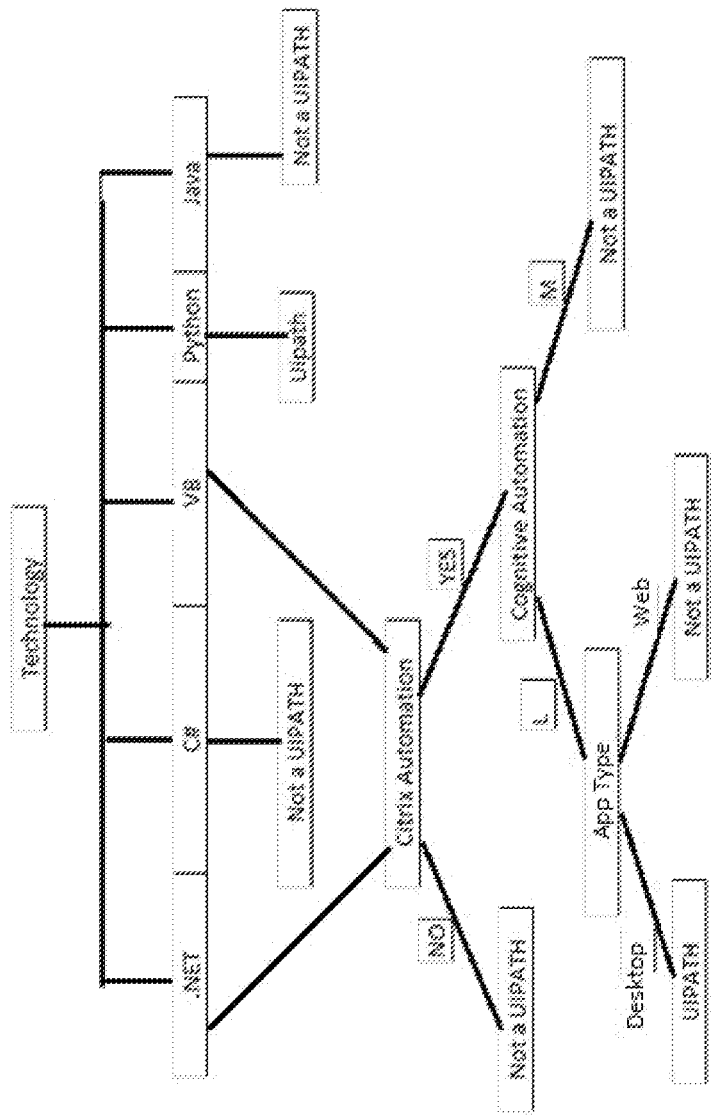
FIG. 2 illustrates a result of decision tree technique involving CART algorithm on historical process data.

By using the values of Information Gain from Table 9, in an embodiment, machine learning based decision tree technique involving Classification and Regression Trees (CART) algorithm may be used on the historical process data. The result of decision tree technique involving CART algorithm on the historical process data is shown in FIG. 2.

The decision tree is created based on the historic data of configuration requirement and already selected RPA tool. When a new configuration requirement comes, based on the decision tree parent node, the parameter is auto-checked. If there are more than one child node for the parameter then the next parameter is checked and process continues until the decision tree algorithm reaches a node which doesn't have more than one child node. This one child node is the selected RPA tool. With respect to FIG. 2, the decision tree technique involving CART algorithm may reach a decision of RPA tool being 'Uipath' or 'Not a Uipath'. The above process or steps may be repeated for each tool if the decision is 'Not a Uipath' for the given input. For instance, the above process or steps may be repeated for each tool i.e. Automation Anywhere, Blueprism, Nice, and a Kofax Kapow. At the end, the selected process automation RPA tool may vary based on the input data and the historical process data. In one example, if the Technology Type is .NET, the App Type is Desktop, the Citrix Automation Availability is Yes, the Coding Dependency Level is Low, and the Cognitive Capability Level is Low, the optimal process automation RPA tool may be 'Uipath'.

BOT selection unit 105: After predicting/selecting the process automation RPA tool, this unit may receive the selected RPA tool and the input data. The BOT selection unit 105 may identify one or more BOTs from a plurality of BOTs based on the selected RPA tool, historical BOT data and the input data for the process execution. The historical BOT data may include different non-configuration requirements and its corresponding BOT. In order to select one or more BOTs, the BOT selection unit 105 may determine similar requirements of the historical BOT data with respect to at least one of the selected RPA tool and the input data. The similar requirement may be determined based on statistical Jaccard index for at least one of the input data, the selected RPA tool and the historic BOT data. The BOT selection unit 105 based on the Jaccard index may fetch the requirements and its corresponding BOTS when the Jaccard index exceeds certain value. The Jaccard index, also, known as Intersection over Union and Jaccard similarity coefficient, is a statistic used for gauging the similarity and diversity of two sets, for example, the input data and the historical BOT data. The Jaccard similarity coefficient may measure similarity between finite sample sets and may be defined as the size of the intersection divided by the size of the union of the sample sets. The BOT selection unit 105 may identify the availability of the BOT for the process execution and the dependencies of multiple BOTs. In case of non-availability of any BOT, the BOT selection unit 105 may determine time period when that particular BOT becomes available. If this time period exceeds pre-determined threshold, then the BOT selection unit 105 may identify next suitable BOT. Here, the BOT may, also, be referred as BOT file.

Process execution unit 107: This unit may, also, be referred as Process Execution Module (PEM). After obtaining one or more BOTs from the BOT selection unit 105, the process execution unit 107 may identify availability of one or more devices for executing the process based on one or more device parameters. The one or more device parameters may include, but is not limited to, browsers, required software, supported tools of the one or more devices. For example, if the process automation system is deployed, the requirements may be executed in a distributed manner on different devices. The devices (shown as blocks A, B, C, D . . . ) may be communicatively coupled with each other for execution of the process. Thus, a pool of devices present at different locations with different capabilities may be determined for execution of the process by the process execution unit 107. The devices may use wired/wireless communication protocols/methods. The communication protocols/methods may include, but is not limited to, a direct interconnection, an e-commerce network, a Peer-to-Peer (P2P) network, Local Area Network (LAN), Wide Area Network (WAN), wired, wireless network (for example, Code-Division Multiple Access (CDMA), High-Speed Packet Access (HSPA+), Global System for Mobile communications (GSM®), Long-Term Evolution (LTE®) and Worldwide interoperability for Microwave access (WiMax®)), Internet, Wi-Fi, Bluetooth and the like. In an embodiment, the process execution unit 107 may be aware of the different capability of the devices connected to it. The process execution unit 107 may determine the availability of the device based on the capability of the device for execution of one or more BOTs. If one device is determined as non-available, the process execution unit 107 may check availability of another device from the pool of devices for execution of the process. Upon identifying the availability of the one or more devices, the process execution unit 107 may transmit information corresponding to the one or more requirements to the one or more identified devices based on the availability to execute the process of batch scripting (of as software application). This information may include the BOTs corresponding to the requirement. Upon transmitting the information corresponding to the requirements, the BOTs related to the requirement may be executed on the identified devices for process execution.

In case of a situation when a process execution may not have gone as expected, the process execution unit 107 may generate an alert for a failed execution of the process. The process execution unit 107 may transmit a notification to a stakeholder of the software application or process execution. All the reports related to the execution of the process may be displayed to the user via display/dashboard unit (not shown in FIG. 1). The display/dashboard unit may be a part of the process automation system communicatively coupled to the process automation system in wired/wireless manner. Further, the input data along with the data related to the execution of the process may, also, be stored to the RPA tool and BOT Repository 109 for enhancing the RPA tool prediction and BOT selection algorithm over the time.

RPA Tool and BOT Repository 109: This unit may be made of (1) Configuration requirement and RPA tool repository (not shown in FIG. 1) and (2) Non-configuration requirement and BOT repository (not shown in FIG. 1). The configuration requirement and RPA tool repository may store the configuration requirement and the corresponding suitable RPA tool as historical process data. This historical process data may, also, include manual selection made by RPA architects of suitable RPA tool for configuration requirement. In an embodiment, a sample (same as Table 1) of historical process data present in the configuration requirement and RPA tool repository may be as below:

In an implementation, the RPA tool and BOT repository 109 may, also, serve as a repository for storing data fetched, processed, received and generated by at least one of the RPA tool prediction unit 103 and the BOT selection unit 105. The input data provided by the user through the I/O interface may be stored in the RPA tool and BOT repository 109.

In an embodiment, the data stored in the RPA tool and BOT repository 109 may be organized using data models, such as relational or hierarchical data models. In an example, the data stored in the RPA tool and BOT repository 109 may, also, comprise other data including temporary data and temporary files, generated by the process automation system for performing the various functions of the process automation system.

In an example, data sources used in the process execution may be, but is not limited to, excel sheets, text files, extensible Markup Language (XML) files, word files, or Portable Document Format (PDF) files.

Figure 3:
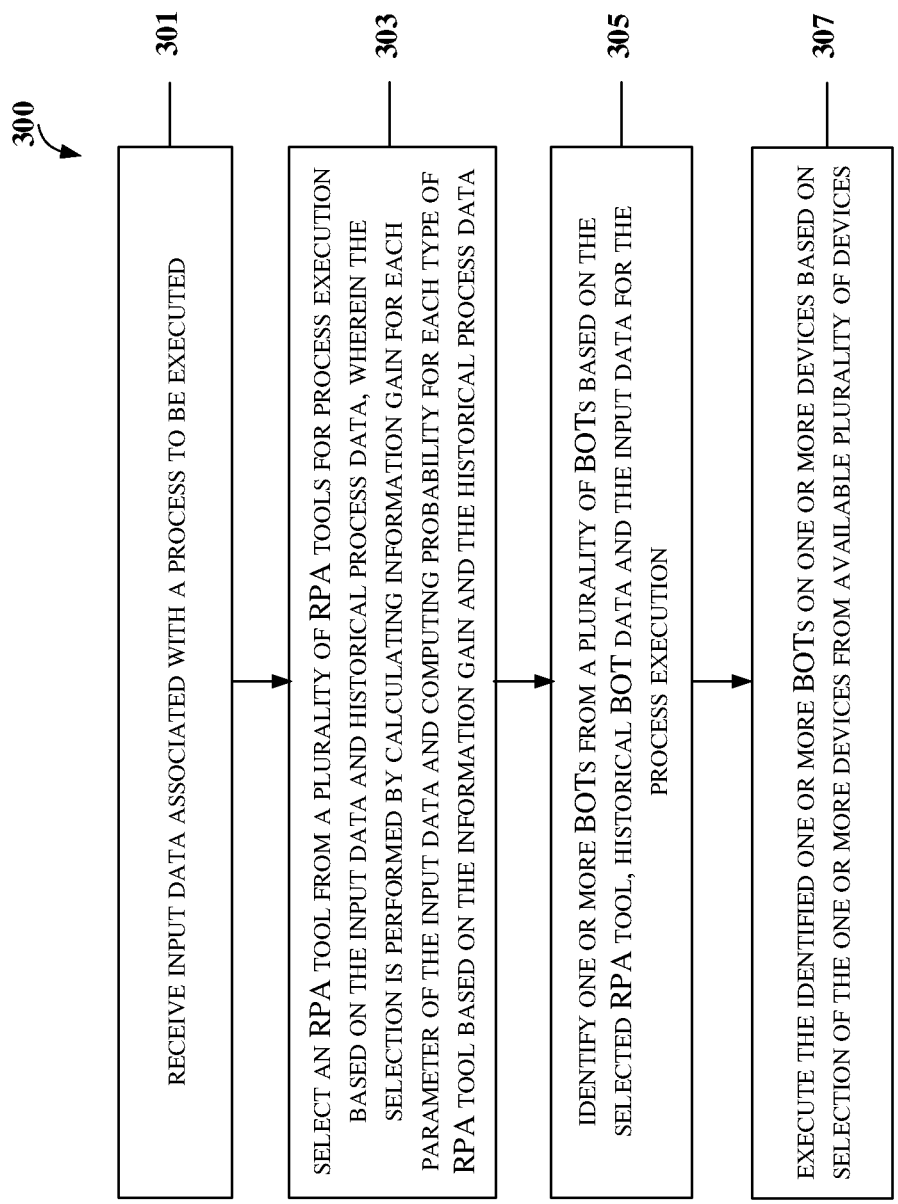
FIG. 3 illustrates flowchart showing a method for automatic selection of process automation RPA tool and BOT in accordance with some embodiments of present disclosure.

FIG. 3 illustrates flowchart showing a method for automatic selection of process automation RPA tool and BOT in accordance with some embodiments of present disclosure.

As illustrated in FIG. 3, the method 300 includes one or more blocks for automatic selection of process automation RPA tool and BOT. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks

TABLE 1

| Technology Type | App Type | Cognitive Capability Level | Macro Recorder Status | Citrix Automation Availability | Coding Dependency Level | RPA Tool |
|---|---|---|---|---|---|---|
| .Net | Desktop | Low | YES | YES | Low | Uipath |
| .Net | Web | Medium | YES | YES | Low | Automation Anywhere |
| C# | Web | Low | NO | YES | Low | Blueprism |
| VB | Desktop | Low | YES | NO | Medium | Nice |
| .Net | Desktop | Medium | YES | NO | Medium | Kofax Kapow |
| VB | Desktop | Low | YES | YES | Low | Uipath |
| Python | Desktop | Low | YES | YES | Low | Uipath |
| Java | Desktop | Medium | YES | NO | Medium | Kofax Kapow |
| C# | Desktop | Low | YES | NO | Medium | Nice |
| .Net | Web | Low | NO | YES | Low | Blueprism |

The non-configuration requirement and BOT repository may store the non-configuration (business) requirement and the corresponding suitable BOT as historical BOT data. This historical BOT data may, also, include manual selection made by RPA architects of suitable BOT for non-configuration requirement. In an embodiment, a sample of historical BOT data present in the non-configuration requirement and BOT repository may be as below in Table 10:

TABLE 10

| Non-configuration Requirement | BOT ID |
|---|---|
| Trade data reconciliation between two sources | BOT 14 |
| Invoice retrieval detection and processing | BOT 2 | may be deleted from the methods without departing from the scope of the subject matter described herein. Furthermore, the method can be implemented in any suitable hardware, software, firmware, or combination thereof.

At block 301, the configuration requirement I/O interface unit 101 of the process automation system may receive input data associated with a process to be executed. The input data may comprise configuration requirement that includes at least one of a technology type parameter, an application type parameter, a cognitive capability level parameter, a macro recorder status parameter, a Citrix automation availability parameter and a coding dependency level parameter. The input data may, also, comprise non-configuration (business) requirement for the process to be executed.

At block 303, the RPA tool prediction unit 103 of the process automation system may select an RPA tool from a plurality of RPA tools for process execution based on the input data and historical process data. The selection may be performed by calculating information gain for each parameter of the input data and computing probability for each type of RPA tool based on the information gain and the historical process data. The information gain may be a measure of reduction in entropy. Furthermore, the selection of the RPA tool may be performed using a machine learning based decision tree technique.

At block 305, the BOT selection unit 105 of the process automation system may identify one or more BOTs from a plurality of BOTs based on the selected RPA tool, historical BOT data and the input data for the process execution. The identification of the one or more BOTs may be performed using statistical Jaccard index.

At block 307, the process execution unit 107 of the process automation system may execute the identified one or more BOTs on one or more devices based on selection of the one or more devices from available plurality of devices. The execution of the process may be performed in a distributed manner.

Some of the advantages of the present disclosure are listed below.

In present day scenario in process automation, the key challenge is the selection of appropriate RPA tool, which is technically complex and time-consuming task. Furthermore, the complexities in selecting of the appropriate RPA tool increases with increase in number of parameters associated with the RPA tool. The present disclosure overcomes the above-mentioned challenges by using machine learning technique that includes decision tree algorithm for the selection of appropriate RPA tool. The application of machine learning technique for the process execution as described in the present disclosure not only allows handling of more parameters in selecting the appropriate RPA tool but also reduces the time required for selecting the appropriate RPA tool for the process automation.

In the present disclosure, when one or more devices identified for execution of one or more BOTs are preoccupied in executing another process, the selection of one or more devices is made from available plurality of devices. This selection step as incorporated in the process execution unit 107 of the present disclosure overcomes delay that would occur by waiting for the identified one or more devices to be free, making the present automation process efficient. Furthermore, this selection step overcomes the need of an RPA architect to identify and select one or more devices from the available plurality of devices due to non-availability of initially selected device.

The process automation system described in the present disclosure is capable of performing process automation for all types of software applications.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media include all computer-readable media except for a transitory. The code implementing the described operations may further be implemented in hardware logic (e.g., an integrated circuit chip, Programmable Gate Array (PGA), Application Specific Integrated Circuit (ASIC), etc.).

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

| REFERRAL NUMERALS: | |
|---|---|
| Reference number | Description |
| 101 | Configuration requirement I/O interface unit |
| 103 | RPA tool prediction unit |
| 105 | BOT selection unit |
| 107 | Process execution unit |
| 109 | RPA tool and BOT repository |

What is claimed is:

1. A method for automatic selection of process automation Robotic Process Automation (RPA) tool and BOT, the method comprising:
receiving, by a process automation system, input data associated with a process to be executed, wherein the input data comprises a technology type parameter, an application type parameter, a cognitive capability level parameter, a macro recorder status parameter, a citrix automation availability parameter and a coding dependency level parameter;
selecting, by the process automation system, an RPA tool from a plurality of RPA tools for process execution based on the input data and historical process data, wherein the selection is performed by calculating information gain for each parameter of the input data based on an impurity for each parameter of the input data and computing probability for each type of RPA tool based on the information gain and the historical process data;
identifying, by the process automation system, one or more BOTs from a plurality of BOTs based on the selected RPA tool, historical BOT data and the input data for the process execution; and
executing, by the process automation system, the identified one or more BOTs on one or more devices based on selection of the one or more devices from available plurality of devices.

2. The method as claimed in claim 1, wherein the selection of the RPA tool is performed using a machine learning based decision tree technique.

3. The method as claimed in claim 1, wherein the information gain is a measure of reduction in entropy.

4. The method as claimed in claim 1, wherein the identification of the one or more BOTs is performed using statistical Jaccard index.

5. The method as claimed in claim 1, wherein the execution of the process is performed in a distributed manner.

6. A process automation system for automatic selection of process automation Robotic Process Automation (RPA) tool and BOT, the system comprising:
a processor; and
a memory communicatively coupled to the processor, wherein the memory stores processor-executable instructions, which on execution, cause the processor to:
receive input data associated with a process to be executed, wherein the input data comprises a technology type parameter, an application type parameter, a cognitive capability level parameter, a macro recorder status parameter, a citrix automation availability parameter and a coding dependency level parameter;
select an RPA tool from a plurality of RPA tools for process execution based on the input data and historical process data, wherein the selection is performed by calculating information gain for each parameter of the input data based on an impurity for each parameter of the input data and computing probability for each type of RPA tool based on the information gain and the historical process data;
identify one or more BOTs from a plurality of BOTs based on the selected RPA tool, historical BOT data and the input data for the process execution; and
execute the identified one or more BOTs on one or more devices based on selection of the one or more devices from available plurality of devices.

7. The process automation system as claimed in claim 6, wherein the selection of the RPA tool is performed using a machine learning based decision tree technique.

8. The process automation system as claimed in claim 6, wherein the information gain is a measure of reduction in entropy.

9. The process automation system as claimed in claim 6, wherein the identification of the one or more BOTs is performed using statistical Jaccard index.

10. The process automation system as claimed in claim 6, wherein the execution of the process is performed in a distributed manner.

11. A non-transitory computer readable medium including instructions stored thereon that when processed by at least one processor cause a process automation system to perform operations comprising:
receiving input data associated with a process to be executed, wherein the input data comprises a technology type parameter, an application type parameter, a cognitive capability level parameter, a macro recorder status parameter, a citrix automation availability parameter and a coding dependency level parameter;
selecting an RPA tool from a plurality of RPA tools for process execution based on the input data and historical process data, wherein the selection is performed by calculating information gain for each parameter of the input data based on an impurity for each parameter of the input data and computing probability for each type of RPA tool based on the information gain and the historical process data;
identifying one or more BOTs from a plurality of BOTs based on the selected RPA tool, historical BOT data and the input data for the process execution; and
executing the identified one or more BOTs on one or more devices based on selection of the one or more devices from available plurality of devices.

12. The medium as claimed in claim 11, wherein the selection of the RPA tool is performed using a machine learning based decision tree technique.

13. The medium as claimed in claim 11, wherein the information gain is a measure of reduction in entropy.

14. The medium as claimed in claim 11, wherein the identification of the one or more BOTs is performed using statistical Jaccard index.

* * * * *